United States Patent
Beukema et al.

(10) Patent No.: US 8,069,353 B2
(45) Date of Patent: *Nov. 29, 2011

(54) LOW-LATENCY DATA DECRYPTION INTERFACE

(75) Inventors: Bruce L. Beukema, Hayfield, MN (US); Robert A. Drehmel, Goodhue, MN (US); William E. Hall, Clinton, CT (US); Jamie R. Kuesel, Rochester, MN (US); Gilad Pivonia, Avichail (IL); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 12/142,007

(22) Filed: Jun. 19, 2008

(65) Prior Publication Data

US 2008/0288780 A1 Nov. 20, 2008

Related U.S. Application Data

(63) Continuation of application No. 10/932,727, filed on Sep. 2, 2004, now Pat. No. 7,409,558.

(51) Int. Cl.
*H04L 9/32* (2006.01)
(52) U.S. Cl. .................. 713/181; 380/210
(58) Field of Classification Search .................. 713/181; 380/210
See application file for complete search history.

(56) References Cited

U.S. PATENT DOCUMENTS

| | | | |
|---|---|---|---|
| 5,191,611 A | 3/1993 | Lang | |
| 5,268,962 A * | 12/1993 | Abadi et al. | 713/161 |
| 5,303,302 A * | 4/1994 | Burrows | 713/161 |
| 5,337,357 A | 8/1994 | Chou et al. | |
| 5,563,946 A | 10/1996 | Cooper et al. | |
| 5,646,687 A * | 7/1997 | Botsford et al. | 375/240.12 |
| 5,721,871 A | 2/1998 | Ginsberg et al. | |
| 5,757,919 A | 5/1998 | Herbert et al. | |
| 5,796,976 A | 8/1998 | Shah et al. | |
| 5,961,626 A * | 10/1999 | Harrison et al. | 710/305 |
| 5,996,062 A * | 11/1999 | Sachs | 712/215 |
| 6,055,615 A * | 4/2000 | Okajima | 711/169 |
| 6,163,832 A * | 12/2000 | Okajima | 711/169 |
| 6,320,907 B1 * | 11/2001 | Pau et al. | 375/240.22 |
| 6,421,730 B1 * | 7/2002 | Narad et al. | 709/236 |

(Continued)

FOREIGN PATENT DOCUMENTS

JP 2004104450 A 4/2004

(Continued)

OTHER PUBLICATIONS

Partial translation of office action for JP2005-251301 as pertains to Kakishima and Onuki references.

(Continued)

*Primary Examiner* — David García Cervetti
(74) *Attorney, Agent, or Firm* — Patterson & Sheridan, LLP

(57) ABSTRACT

Methods and apparatus for reducing the impact of latency associated with decrypting encrypted data are provided. Rather than wait until an entire packet of encrypted data is validated (e.g., by checking for data transfer errors), the encrypted data may be pipelined to a decryption engine as it is received, thus allowing decryption to begin prior to validation. In some cases, the decryption engine may be notified of data transfer errors detected during the validation process, in order to prevent reporting false security violations.

5 Claims, 4 Drawing Sheets

U.S. PATENT DOCUMENTS

| | | | |
|---|---|---|---|
| 6,434,699 B1* | 8/2002 | Jones et al. | 713/168 |
| 6,477,646 B1* | 11/2002 | Krishna et al. | 713/189 |
| 6,704,871 B1* | 3/2004 | Kaplan et al. | 713/192 |
| 6,708,273 B1* | 3/2004 | Ober et al. | 713/189 |
| 6,742,107 B2 | 5/2004 | Jinzaki | |
| 6,751,756 B1* | 6/2004 | Hartnett et al. | 714/54 |
| 6,760,439 B1* | 7/2004 | Windirsch | 380/37 |
| 6,839,346 B1 | 1/2005 | Kametani | |
| 6,859,841 B2* | 2/2005 | Narad et al. | 709/236 |
| 6,870,929 B1* | 3/2005 | Greene | 380/28 |
| 6,925,563 B1* | 8/2005 | Jennings | 713/174 |
| 6,931,543 B1 | 8/2005 | Pang et al. | |
| 6,971,006 B2* | 11/2005 | Krishna et al. | 713/161 |
| 7,188,250 B1* | 3/2007 | Alfieri et al. | 713/181 |
| 7,190,790 B1* | 3/2007 | Hill et al. | 380/44 |
| 7,254,637 B2 | 8/2007 | Pinkerton et al. | |
| 7,260,217 B1* | 8/2007 | Carlson | 380/37 |
| 7,305,567 B1* | 12/2007 | Hussain et al. | 713/189 |
| 7,320,069 B1 | 1/2008 | Sundharraj et al. | |
| 7,324,547 B1* | 1/2008 | Alfieri et al. | 370/461 |
| 7,362,772 B1* | 4/2008 | Alfieri et al. | 370/429 |
| 7,362,859 B1* | 4/2008 | Robertson et al. | 380/37 |
| 7,366,784 B2 | 4/2008 | Ishizaki | |
| 7,406,595 B1* | 7/2008 | Boyle et al. | 713/160 |
| 7,409,558 B2 | 8/2008 | Beukema et al. | |
| 7,412,726 B1* | 8/2008 | Viswanath | 726/26 |
| 7,496,753 B2 | 2/2009 | Beukema et al. | |
| 7,512,787 B1* | 3/2009 | Viswanath et al. | 713/160 |
| 7,526,085 B1* | 4/2009 | Bong | 380/37 |
| 7,539,859 B2* | 5/2009 | Hayashi | 713/153 |
| 7,545,928 B1* | 6/2009 | Goh | 380/29 |
| 7,580,519 B1* | 8/2009 | Goh | 380/29 |
| 7,603,549 B1* | 10/2009 | Kay | 713/160 |
| 2002/0048364 A1* | 4/2002 | Gligor et al. | 380/37 |
| 2002/0087724 A1 | 7/2002 | Datta et al. | |
| 2002/0184462 A1* | 12/2002 | Jeddeloh | 711/169 |
| 2002/0191790 A1* | 12/2002 | Anand et al. | 380/255 |
| 2002/0191793 A1* | 12/2002 | Anand et al. | 380/255 |
| 2002/0199101 A1* | 12/2002 | Krishna et al. | 713/161 |
| 2003/0014627 A1* | 1/2003 | Krishna et al. | 713/153 |
| 2003/0169877 A1* | 9/2003 | Liu et al. | 380/28 |
| 2003/0196076 A1* | 10/2003 | Zabarski et al. | 712/234 |
| 2003/0196081 A1* | 10/2003 | Savarda et al. | 713/153 |
| 2004/0114589 A1* | 6/2004 | Alfieri et al. | 370/389 |
| 2004/0158706 A1 | 8/2004 | Moritomo et al. | |
| 2004/0218760 A1* | 11/2004 | Chaudhuri | 380/217 |
| 2004/0230791 A1* | 11/2004 | Boebert et al. | 713/150 |
| 2005/0047757 A1* | 3/2005 | Hayashi | 386/124 |
| 2005/0058438 A1* | 3/2005 | Hayashi | 386/116 |
| 2005/0097293 A1* | 5/2005 | Hayashi | 711/169 |
| 2005/0105738 A1* | 5/2005 | Hashimoto | 380/277 |
| 2005/0198531 A1* | 9/2005 | Kaniz et al. | 713/201 |
| 2005/0256975 A1* | 11/2005 | Kaniz et al. | 709/250 |
| 2006/0047953 A1 | 3/2006 | Beukema et al. | |
| 2006/0047975 A1 | 3/2006 | Beukema et al. | |
| 2006/0080553 A1 | 4/2006 | Hall | |
| 2006/0149988 A1* | 7/2006 | Thomas et al. | 713/401 |
| 2006/0242313 A1* | 10/2006 | Le et al. | 709/230 |
| 2008/0037777 A1* | 2/2008 | Ignatius et al. | 380/44 |
| 2009/0144564 A1 | 6/2009 | Beukema et al. | |

FOREIGN PATENT DOCUMENTS

| | | |
|---|---|---|
| JP | 2004180234 A | 6/2004 |
| JP | 2004345247 A | 12/2004 |

OTHER PUBLICATIONS

Kakishima, Shinji—"Understanding with diagram, Network technology from the basis, The 4th (OSI Reference Model), standard virtual communication model which shows the role of the network equipment", N+1 Network Guide, Softbank Publishing Corporation, Sep. 1, 2002, vol. 2, No. 9, pp. 16-21.

Onuki, Atsushi et al.—"A Realization of Theoretical Maximum Performance in IPSec on Gigabit Ethernet", The transactions of the Institute of Electrical Engineers of Japan, Aug. 1, 2004, vol. 124, No. 8, pp. 1533-1537.

* cited by examiner

US 8,069,353 B2

LOW-LATENCY DATA DECRYPTION INTERFACE

CROSS-REFERENCE TO RELATED APPLICATIONS

This application is a continuation of U.S. patent application Ser. No. 10/932,727, filed Sep. 2, 2004 and issued on Aug. 5, 2008 as U.S. Pat. No. 7,409,558 which is herein incorporated by reference in its entirety.

BACKGROUND OF THE INVENTION

1. Field of the Invention

The present invention generally relates to data encryption and, more particularly, to methods and apparatus for reducing latency associated with decrypting previously encrypted data.

2. Description of the Related Art

A system on a chip (SOC) generally includes one or more integrated processor cores, some type of embedded memory, such as a cache shared between the processors cores, and peripheral interfaces, such as memory control components and external bus interfaces, on a single chip to form a complete (or nearly complete) system. The use of cache memory hierarchies is well established to improve a processor performance by reducing and/or eliminating read access requests to external main memory. As used herein, the term latency generally refers to the amount of time it takes before data is available at a processor core after a request from memory control for data that is not currently available in a nearby (L1 or L2) cache memory.

As part of an enhanced security feature, some SOCs encrypt some portions of data prior to storing it in external memory, for example, to prevent a hacker from obtaining instructions of a copyrighted program, such as a video game, or data that may be used to determine such instructions through reverse engineering. Such encrypted data must first be decrypted before it can be used by the processor in any computation. Therefore, an additional latency is introduced due to the need to decrypt data that was stored in external memory in an encrypted format.

This latency may add significant delay to the execution to be performed on the decrypted data. In addition, this latency may prevent the transfer of subsequent unencrypted data, which can further impact system performance. Accordingly, what is needed is a mechanism to minimize latency impacts of data that is to be decrypted.

SUMMARY OF THE INVENTION

The present invention generally provides methods and apparatus for reducing the amount of latency involved in decrypting encrypted data.

One embodiment provides a method of reducing the amount of latency associated with decrypting encrypted data transmitted in a data packet. The method generally includes receiving at least a portion of a first data packet containing at least a portion of a block of encrypted data, buffering the received portion of the block of encrypted data, and pipelining the received portion of the block of encrypted data to a decryption engine to begin decryption of the block of encrypted data prior to receiving remaining portions of the first data packet.

Another embodiment provides a method of reducing latency associated with decrypting data. The method generally includes: (a) receiving at least a portion of a data packet containing at least a portion of a block of encrypted data; (b) buffering the received portion of the block of encrypted data; (c) pipelining the received portion of the block of encrypted data to a decryption engine to begin decryption operations prior to checking the data packet for data transfer errors; (d) repeating operations (a)-(c) until the data packet is received in its entirety; and (e) checking the entire data packet for one or more data transfer errors.

Another embodiment provides a system for decrypting packets of encrypted data generally including a buffer device, a packet validation component, a decryption engine, and a packet decoder. The packet decoder is generally configured to receive portions of a data packet, buffer received portions of the data packets in the buffer device, and, if the data packet contains encrypted data, pipeline the received portions of the data packets to the decryption engine to begin decryption of the encrypted data prior to receiving remaining portions of a data packet.

Another embodiment provides a system on a chip (SOC) generally including one or more processor cores, a shared cache for holding data accessed by the one or more processor cores, a decryption engine, and a packet decoder. The packet decoder is generally configured to receive portions of a first data packet containing encrypted data and pipeline the received portions of the data packets to the decryption engine to begin decryption of the encrypted data prior to receiving the complete data packet and checking the complete data packet for data transfer errors.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention may be utilized to reduce the impact of latency associated with decrypting encrypted data. Rather than wait until an entire packet of encrypted data is validated (e.g., by checking for data transfer errors), the encrypted data may be pipelined to a decryption engine as it is received, thus allowing decryption to begin prior to validation. For some embodiments, the decryption engine may be notified of data transfer errors detected during the validation process, in order to prevent reporting false security violations.

As used herein, the term data packet generally refers to a stream of data sent over a bus in a predefined format, for example, including a header containing information about the data contained in the packet. Often, data packets will include some sort of validation value generated as a function of the data, referred to herein generically as checksum, regardless of its actual type, whether it be a cyclic redundancy check (CRC) value, hash value, or some other type of value. Further, while a distinction may be made in the following description between instructions and data acted on by those instructions, it should be understood that both such data and instructions may be contained as data in a data packet.

An Exemplary System

Figure 1:
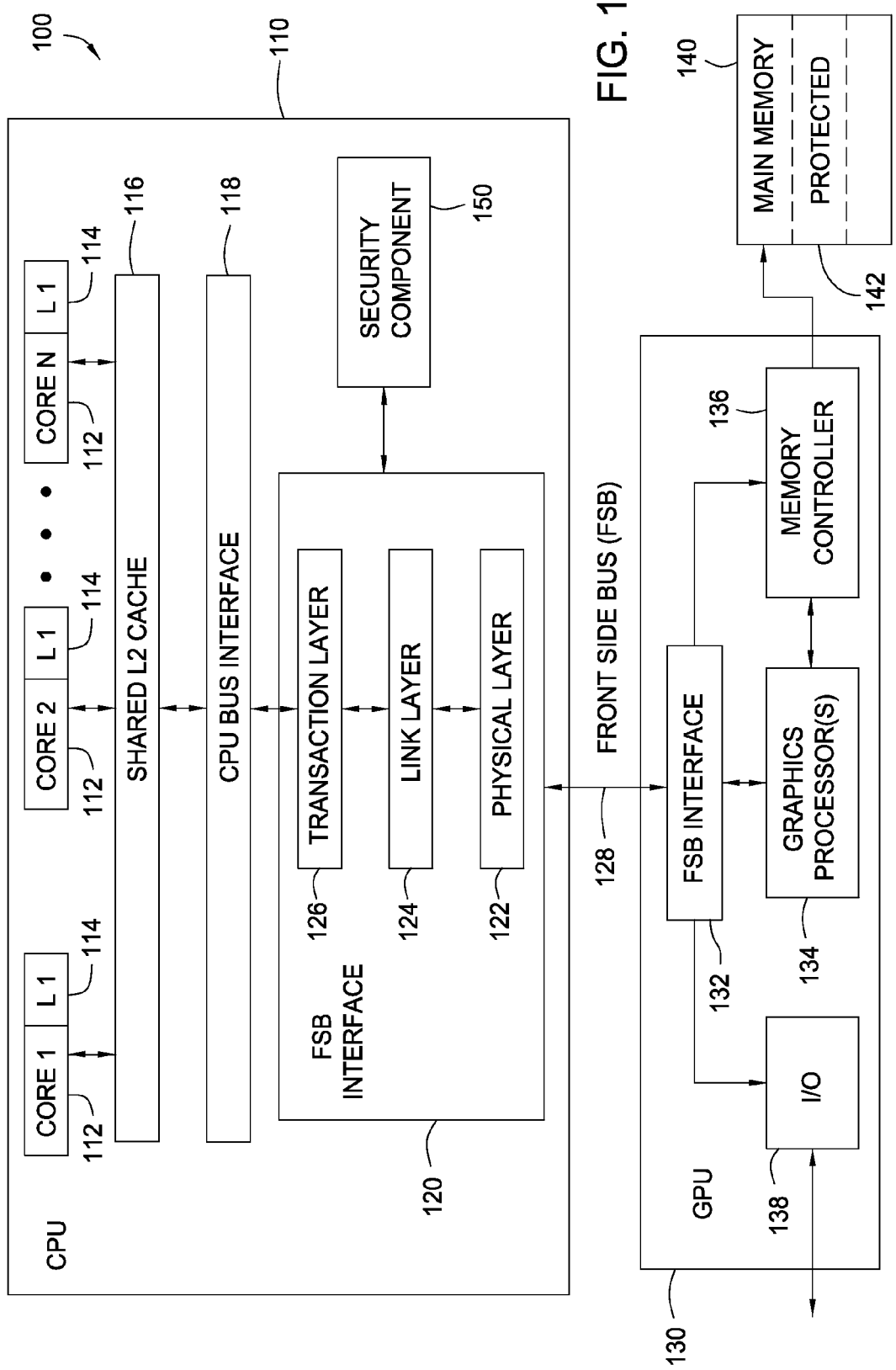
FIG. 1 illustrates an exemplary system including a central processing unit (CPU), in which embodiments of the present invention may be utilized.

FIG. 1 illustrates an exemplary computer system 100 including a central processing unit (CPU) 110, in which embodiments of the present invention may be utilized. As illustrated, the CPU 110 may include one or more processor cores 112, which may each include any number of different type function units including, but not limited to arithmetic logic units (ALUs), floating point units (FPUs), and single instruction multiple data (SIMD) units. Examples of CPUs utilizing multiple processor cores include the Power PC line of CPUs, available from IBM.

As illustrated, each processor core 112 may have access to its own primary (L1) cache 114, as well as a larger secondary (L2) cache 116. The L2 cache 116 may be shared by each processor core 112 or each processor core 112 may have its own L2 cache 116. In general, copies of data utilized by the processor cores 112 may be stored locally in the L2 cache 116, preventing or reducing the number of relatively slower accesses to external main memory 140. Similarly, data utilized often by a processor core 112 may be stored in its L1 cache 114, preventing or reducing the number of relatively slower accesses to the L2 cache 116.

The CPU 110 may communicate with external devices, such as a graphics processing unit (GPU) 130 and/or a memory controller 136 via a system or frontside bus (FSB) 128. The CPU 110 may include an FSB interface 120 to pass data between the external devices and the processing cores 112 (through the L2 cache) via the FSB 128. An FSB interface 132 on the GPU 130 may have similar components as the FSB interface 120, configured to exchange data with one or more graphics processors 134, input output (I/O) unit 138, and the memory controller 136 (illustratively shown as integrated with the GPU 130). For some embodiments, the GPU 130 may utilize the same techniques and/or apparatus described herein to reduce latency associated with decrypting encrypted data.

As illustrated, the FSB interface 120 may include a physical layer 122, link layer 124, and transaction layer 126. The physical layer 122 may include hardware components for implementing the hardware protocol necessary for receiving and sending data over the FSB 128. The physical layer 122 may exchange data with the link layer 124 which may format data received from or to be sent to the transaction layer 126. As illustrated, the transaction layer 126 may exchange data with the processor cores 112 via a core bus interface (CBI) 118.

As previously described, as part of an enhanced security feature, the CPU 110 may encrypt some portions of data prior to storing it in main memory 140 (such encrypted portions of data are illustratively shown as protected data 142 in main memory 140). Accordingly, the CPU 110 may include a security component 150 used to encrypt such data prior to transmission over the FSB 128 by the FSB interface 120. Upon later retrieval of the encrypted data, the security component 150 may also be used to decrypt the encrypted data prior to passing it into the L2 cache 116 for use by one or more of the processor cores 112.

Figure 2:
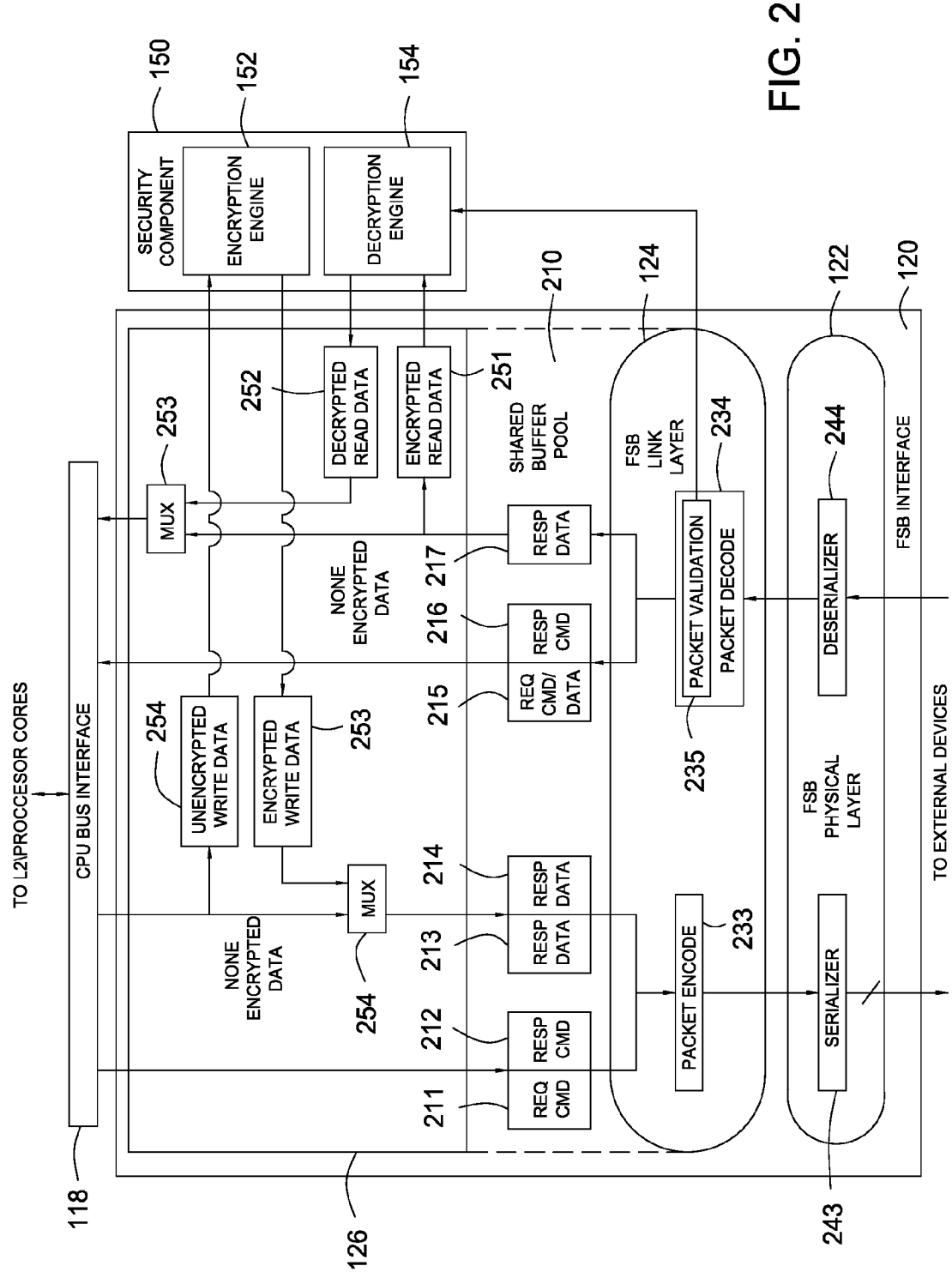
FIG. 2 is a block diagram of components of the CPU, according to one embodiment of the present invention.

As shown in FIG. 2, a number of data streams (also referred to as virtual channels) may be established to exchange data between the processor cores 112 and external devices. Establishing the separate streams may improve overall system performance, for example, allowing one processing core to transfer data while another processes data (and is not transferring data). As illustrated, the streams may share a common buffer pool 210, with each stream utilizing its own portion of the buffer pool 210, in effect establishing separate buffers 211-217.

For some embodiments, data may be sent over the FSB as packets. Therefore, the link layer 124 may contain circuitry, such as a packet encoder 233 configured to encode into packets or "packetize" data received from the transaction layer 126 and a packet decoder 234 to decode packets of data received from the physical layer 122. As shown, the physical layer 122 may include a serializer 243 and a de-serializer 244 for generating and receiving such packets, respectively. Typically, the packet decoder 234 will include a packet validation component 235 configured to check a received data packet for data transfer errors, for example, by comparing a checksum calculated on the received data with a checksum contained in the data packet.

Low-Latency Data Decryption

The packet decoder 234 may forward received data to one or more receive buffers 215-217. The primary purpose of the receive buffers 215-217 may be for "speed matching" between the input and output interfaces of the FSB interface 120. As used herein, the term speed-matching generally refers to the need to accumulate a sufficient amount of data before forwarding it to account for the differences in clock speed and/or data width between the input and output interfaces (e.g., the FSB 128 and the CBI 118).

As illustrated, some of the data, such as data request and response commands sent to buffers 215 and 216, may be non-encrypted and may, therefore be passed directly to cache 116. Response data, on the other hand, may include both encrypted and non-encrypted data. While the non-encrypted data can be passed directly to cache 116, encrypted data 251 must first be decrypted. Therefore, the encrypted data 251 may be routed to the decryption engine 154. The decryption engine 154 may decrypt the encrypted data 251 and pass back decrypted data 252. As illustrated, the decrypted data 252 may be merged with the non-encrypted data and passed to the cache 116 using a multiplexor circuit 253. For example, the decryption engine 154 may assert a signal to the multiplexor circuit 253 when decrypted data 252 is available to be passed to the cache 116.

As previously described, in conventional decryption schemes, the decryption process may result in significant latency as the data is being decrypted. In conventional decryption schemes, a complete packet of data is validated before the data is sent to the decryption engine 154. However, embodiments of the present invention may reduce the amount of latency typically associated with data decryption by pipelining received encrypted data 251 to the decryption engine 154 prior to receiving and validating the entire data packet.

For example, the packet decoder 234 may transfer encrypted data 251 to the decryption engine 154 as it is received. In parallel, data validation may be performed by the validation component 235, for example, by generating a checksum on the encrypted data 251 as it is received. Accordingly, decryption operations may begin prior to validation, reducing total overall latency. Further, by allowing the encrypted data 251 to be pipelined to the decryption engine 154 and allowing the decrypted data 252 to be merged back with non-encrypted data, the packet decoder 234 may be freed up to receive subsequent packets of non-encrypted data. As a result, in contrast to conventional decryption schemes, schemes in accordance with embodiments of the present invention may prevent the latency associated with decryption from blocking the transfer of subsequently received non-encrypted data packets.

Figure 3:
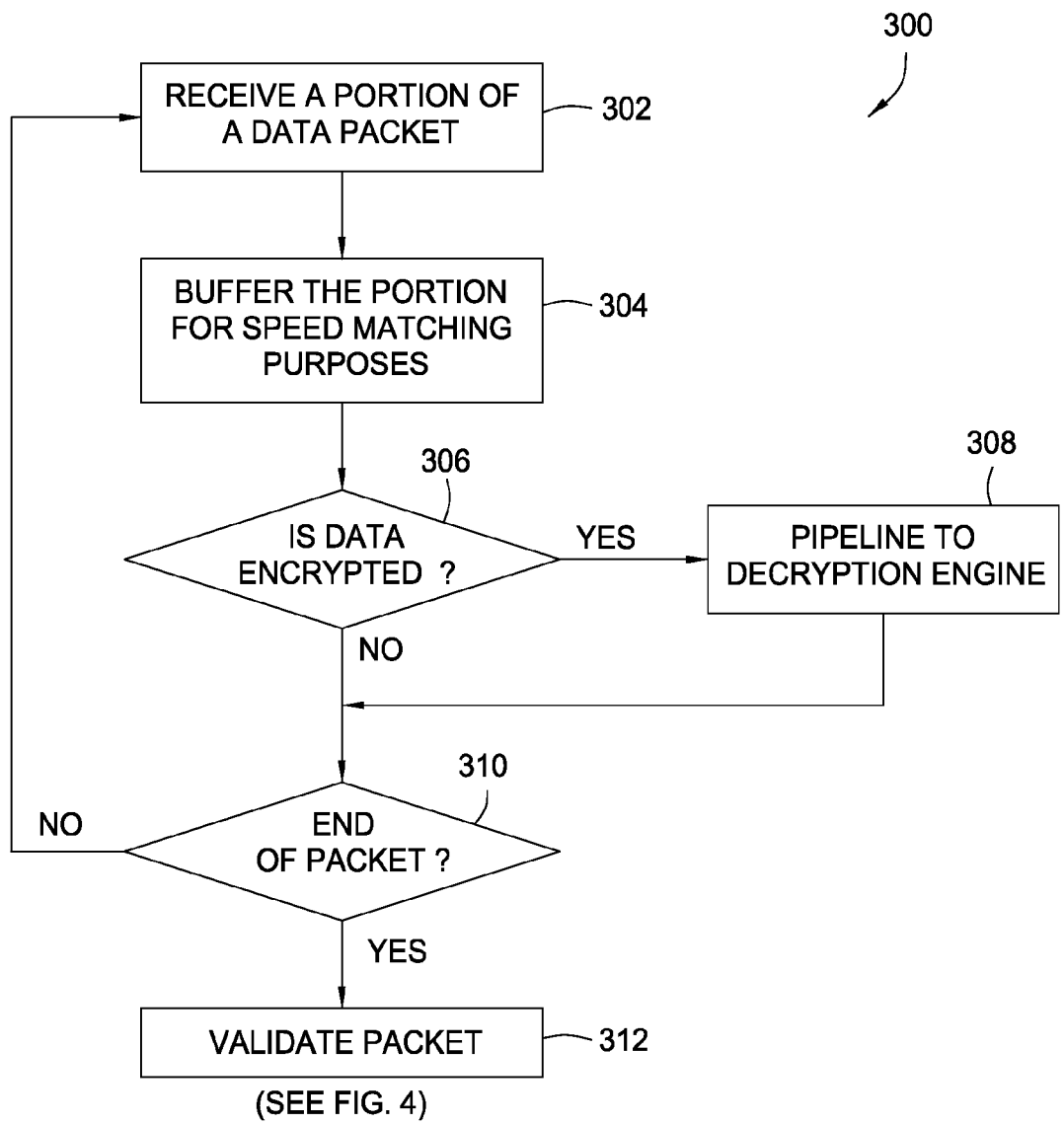
FIG. 3 is a flow diagram of exemplary operations for decrypting data according to one embodiment of the present invention.

FIG. 3 illustrates exemplary operations 300 that may be performed, for example, by the illustrated components in the FSB interface 120, to decrypt encrypted data prior to validating a data packet containing the encrypted data. The operations begin, at step 302, by receiving a portion of data of a data packet.

For example, the data may be received by the packet decoder 234, from the de-serializer 244. In order to allow for later validation of the data packet by the packet validation component 235, the data is buffered (e.g., for speed-matching purposes) by the packet decoder 234, at step 304. As previously described, the data may be validated as it is received. If the data is not encrypted, as determined at step 306, and the data is not the last data in the packet, as determined at step 310, operations return to step 302 to receive another portion of data.

However, if the data is encrypted, the encrypted data is first pipelined to the decryption engine 154, at step 308. As a result, the decryption engine 154 may be able to begin decrypting the encrypted data without waiting until the entire data packet is received and validated. By allowing the decryption to start before the packet is validated, the total latency associated with the decryption may be reduced.

In some cases, due to the high speed in which data is transferred over the FSB 128, data transfer errors may occur. Therefore, once all of the data of the packet is received, as determined at step 310, the packet may be validated, at step 312. The packet may be validated using any suitable known or unknown techniques, such as by comparing a checksum, generated as a function of data in the packet, with a checksum sent with the packet. As previously described, the checksum may be any type of suitable value, such as a CRC value or hash value. Circuitry for generating the checksum may be included in the packet validation component 235.

Preventing False Security Violations

For some embodiments, some type of mechanism may be in place to detect security violations due to unauthorized tampering of encrypted data 251, for example, by examining the decrypted data 252. However, in some cases, unauthorized tampering may be indistinguishable from changes in the encrypted data 251, as received by the decryption engine 154, due to data transfer errors. Unfortunately, a failure to distinguish between modification of encrypted data 251 due to unauthorized tampering and modification due to data transfer errors may lead to the reporting of false security violations.

Therefore, for some embodiments, prior to passing decrypted data 252 to the cache 116, the decryption engine 154 may first determine if the data packet containing the encrypted data is validated. As illustrated in FIG. 2, for some embodiments, the packet validation component 235 may generate a (VALID/INVALID) signal to notify the decryption engine 154 validation (data transfer) errors have been detected in the data packet. In response to the signal, the decryption engine may discard decrypted data 252 and disregard any detected security violations.

Figure 4:
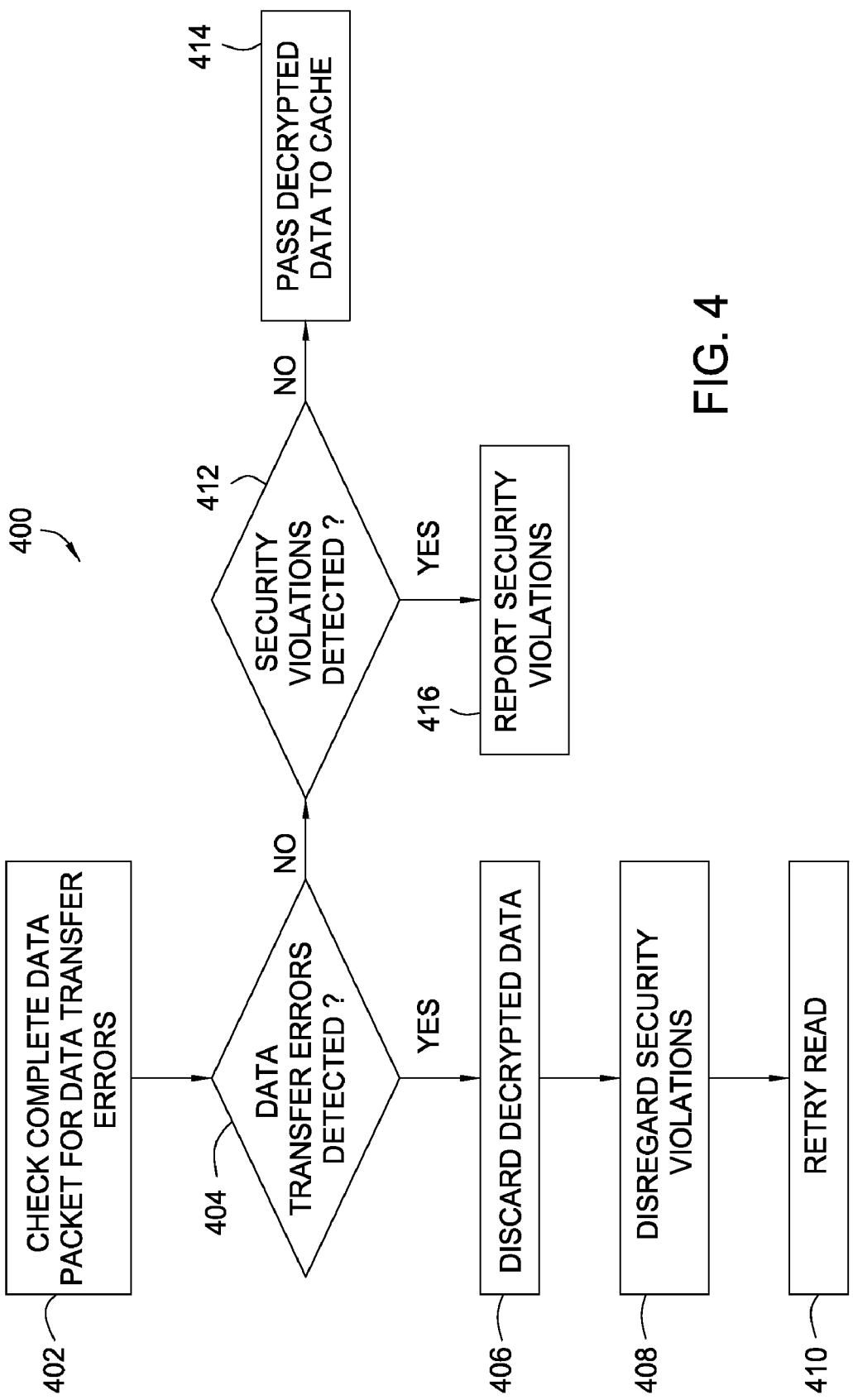
FIG. 4 is a flow diagram of exemplary operations for detecting data transfer errors according to one embodiment of the present invention.

FIG. 4 illustrates an exemplary sequence of operations 400 that may be performed, for example, by the packet validation component 235 and the decryption engine 154 to detect packet validation errors and prevent the reporting of false security violations. In the following description, it is assumed that a complete packet of data has been received.

The operations 400 begin, at step 402, by checking the complete packet for data transfer errors. If any data transfer errors are detected, as determined at step 404, the decrypted data 252 is disregarded, at step 406. Further, as any data transfer errors may have corrupted the encrypted data sent to the decryption engine 154, any security violations detected by the decryption engine 154 are disregarded, at step 408. Operations to retry reading the encrypted data may be performed, at step 410.

On the other hand, if no data transfer errors are detected, it can be assumed the decryption engine 154 received the encrypted data free of error. Therefore, any security violations detected at step 412 (e.g., using local ICVs as described above), may be assumed valid (e.g., resulting from tampering with the encrypted data) and are reported, at step 416. If no security violations are detected, the decrypted data 252 is passed to the cache memory 116, at step 414. As previously described, for some embodiments, the decrypted data 252 may be merged with subsequently received unencrypted data.

CONCLUSION

By pipelining encrypted data to a decryption engine prior to validating a complete packet containing the encrypted data, the latency associated with conventional decryption mechanisms may be reduced. The decryption engine may still be notified of validation errors, however, to prevent passing invalid data and the reporting of false security violations. Further, for some embodiments, subsequently received unencrypted data may be transferred prior to completion of the decryption operations.

While the foregoing is directed to embodiments of the present invention, other and further embodiments of the invention may be devised without departing from the basic scope thereof, and the scope thereof is determined by the claims that follow.

What is claimed is:

1. A system on a chip (SOC), comprising:
  one or more processor cores;
  a cache for holding data accessed by the one or more processor cores, including a received portion of a first data packet containing at least a portion of a block of encrypted data;
  a decryption engine; and
  a packet decoder configured to pipeline the received portion of the first data packet to the decryption engine to begin decryption of the encrypted data prior to receiving the complete first data packet and checking the complete first data packet for data transfer errors; and further configured, after receiving remaining portions of the first data packet, to:
    check the first data packet for data transfer errors using buffered portions of the encrypted data;
    check for security violations with the decryption engine after decryption of the block of encrypted data; and
    disregard any detected security violations in response to detecting data transfer errors.

2. A system on a chip (SOC), comprising:
  one or more processor cores;

a cache for holding data accessed by the one or more processor cores, including a received portion of a first data packet containing at least a portion of a block of encrypted data;

a decryption engine; and a packet decoder configured to pipeline the received portion of the first data packet to the decryption engine to begin decryption of the encrypted data prior to receiving the complete first data packet and checking the complete first data packet for data transfer errors; and further configured, after receiving remaining portions of the first data packet, to:

check the first data packet for data transfer errors using buffered portions of the encrypted data;

check for security violations with the decryption engine after decryption of the block of encrypted data;

disregard any detected security violations in response to detecting data transfer errors; and notify the decryption engine in response to detecting data transfer errors.

3. A system on a chip (SOC), comprising:

one or more processor cores;

a cache for holding data accessed by the one or more processor cores, including a received portion of a first data packet containing at least a portion of a block of encrypted data;

a decryption engine; and a packet decoder configured to pipeline the received portion of the first data packet to the decryption engine to begin decryption of the encrypted data prior to receiving the complete first data packet and checking the complete first data packet for data transfer errors; and further configured, after receiving remaining portions of the first data packet, to:

check the first data packet for data transfer errors using buffered portions of the encrypted data;

check for security violations with the decryption engine after decryption of the block of encrypted data;

disregard any detected security violations in response to detecting data transfer errors; and buffer received portions of a second data packet containing non-encrypted data prior to completion of decryption of the encrypted data contained in the first data packet.

4. The SOC of claim 3, wherein the packet decoder is further configured to pass the non-encrypted data to the cache prior to completion of decryption of the encrypted data contained in the first data packet.

5. The SOC of claim 4, further comprising circuitry for merging decrypted data from the decryption engine to be passed to the cache with the non-encrypted data.

\* \* \* \* \*